United States Patent [19]

Liu et al.

[11] Patent Number: 5,325,625
[45] Date of Patent: Jul. 5, 1994

[54] AUTOMATED ADJUSTABLE INTERVAL INSECT TRAP

[75] Inventors: Yongbiao Liu; Kenneth F. Haynes, both of Lexington, Ky.

[73] Assignee: University of Kentucky Research Foundation, Lexington, Ky.

[21] Appl. No.: 119,276

[22] Filed: Sep. 9, 1993

[51] Int. Cl.$^5$ ............................................. A01M 1/14
[52] U.S. Cl. ........................................ 43/114; 43/111
[58] Field of Search ................ 43/124, 107, 111, 115, 43/116, 114

[56] References Cited

U.S. PATENT DOCUMENTS

| | | |
|---|---|---|
| 1,232,762 | 7/1917 | Brown . |
| 1,477,081 | 12/1923 | Salinas .................................. 43/114 |
| 1,961,303 | 6/1934 | Reynolds ............................. 43/111 |
| 2,274,547 | 2/1942 | Jackson ................................ 43/111 |
| 4,074,457 | 2/1978 | Sato et al. . |
| 4,145,836 | 3/1979 | Zeller .................................... 43/115 |
| 4,694,604 | 9/1987 | Mitchell . |

Primary Examiner—P. Austin Bradley
Assistant Examiner—Chuck Y. Mah
Attorney, Agent, or Firm—King and Schickli

[57] ABSTRACT

An automated, adjustable-interval insect trap includes a plurality of individual cards having a surface coated with insect adhesive to capture insects. The cards are received on trays having wheels that engage a series of four parallel guide rails. By operation of a positioning mechanism, the trays carrying the cards are moved along the guide rails, one at a time, into an insect capturing position for a selected time interval. The positioning mechanism includes a timer, a drive motor, an axle operatively connected to the drive motor and a series of spaced fan plates mounted on the axle at longitudinally spaced positions. The plates function to sequentially pass the trays under the force of gravity along the guide rails as the axle is rotated by the drive motor.

22 Claims, 2 Drawing Sheets

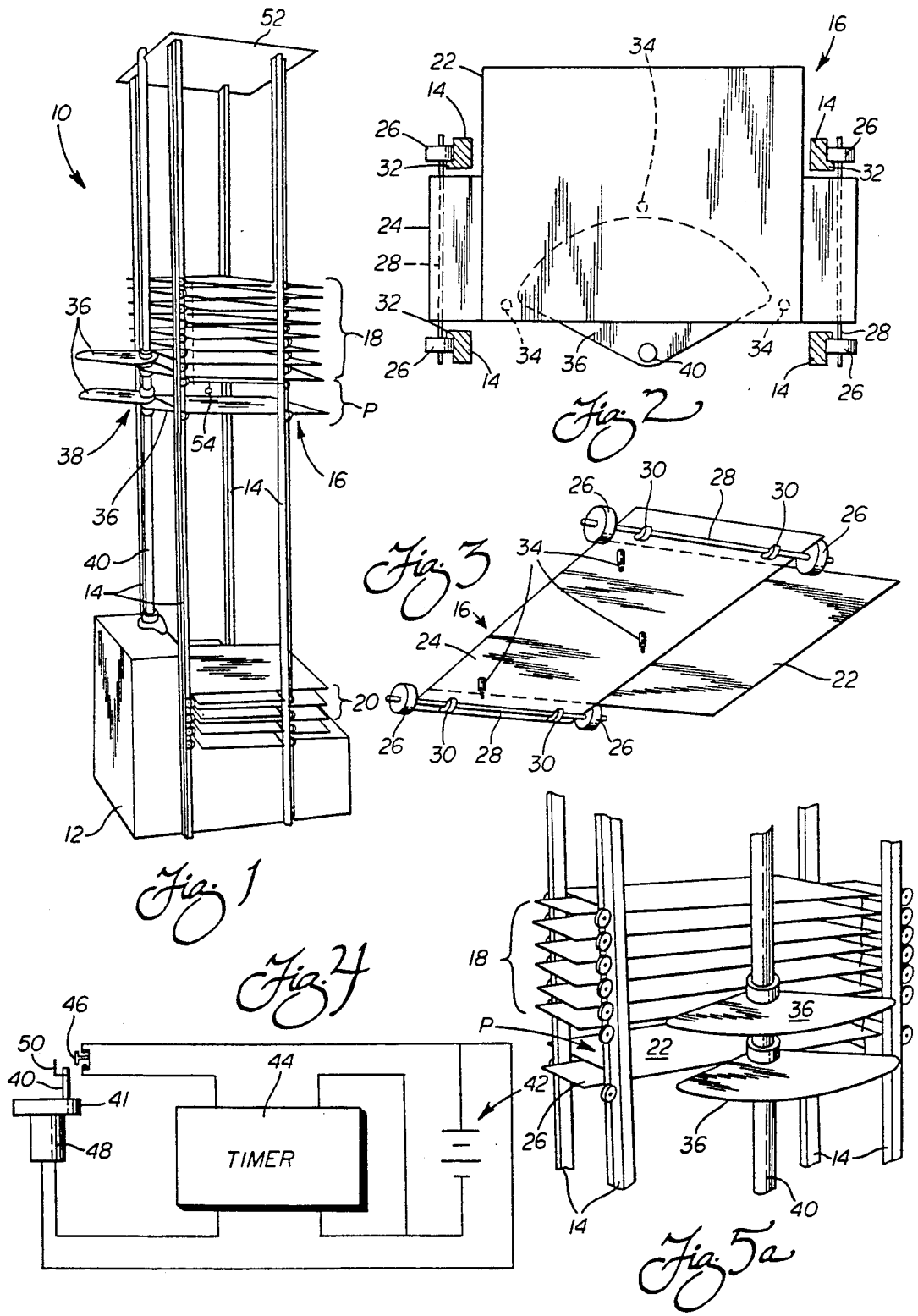

AUTOMATED ADJUSTABLE INTERVAL INSECT TRAP

TECHNICAL FIELD

The present invention relates generally to the field of entomology and, more particularly, to an automated insect trap that furnishes a permanent record of the time interval when insects were captured so as to allow convenient, competent and reliable study of insect populations and activities.

BACKGROUND OF THE INVENTION

It is known that the monitoring of insect population trends and insect activity are essential components of integrated pest management. The most effective means to achieve this end has been found to be the utilization of an insect trap providing a permanent record of the time interval when insects are captured. One device to achieve this end is disclosed in Russian patent specification 1225512A. The insect collecting device disclosed in this patent includes a funnel having a cylindrical base and an inclined plate defining a slit. Insects trapped in the funnel fall through the slit into an underlining vessel including radial partitions defining separate compartments. A timer aligns the slit at the bottom of the funnel with a different compartment of the vessel at a predetermined interval. Thus, the various compartments defined between the partitions receive insects at different time intervals so as to provide a record of insect activity.

While this device is effective for keeping a record of the time interval when an insect is trapped, it does suffer from a number of shortcomings. For instance, the insects are delivered through the slit and into the relatively narrow, neck portion of the partition. Accordingly, this area is relatively small and has a tendency to quickly fill with insects. Thus, even if the partition is treated with insect adhesive, later captured insects may land upon and only come into contact with previously captured insects already held in the adhesive. As a result, these later insects may escape from the compartment possibly into anther compartment thereby skewing insect population and activity data.

Additionally, it should be appreciated that the partitioned container is relatively bulky and inconvenient to utilize. Depending upon the setting of the time interval, it should be appreciated that many times only a few of the compartments contain captured insects and are of interest for a particular study. Still, however, the entire bulky and relatively cumbersome container must be handled. Because of these and other shortcomings, a need has been identified for an improved adjustable time interval insect trap.

SUMMARY OF THE INVENTION

Accordingly, it is the primary object of the present invention to provide an automated, adjustable-interval insect trap overcoming the above-described limitations and disadvantages of the prior art.

Another object of the present invention is to provide an insect trap of relatively simple construction and light weight, portable design capable of providing a permanent record of the time interval when insects were captured.

Still another object of the present invention is to provide an automated, interval clocking insect trap providing reliable operation over a long service life and time interval adjustment to allow better determination of the periodicity of insect populations and activities.

Still another object of the invention is to provide an insect trap utilizing individual plates to trap or capture insects for a selected time interval. Such plates are particularly convenient for study purposes as they allow the entomologist to make a permanent record of insect populations and activities. As, the apparatus allows entomologists to monitor insect populations over long time periods, the apparatus is important in aiding decision making in integrated pest management. Additionally, the apparatus allows the entomologist to study periodicities of responses of insects to semiochemicals or pheromones. As utilized in this application, pheromones are chemical substances produced by insects or synthetically that serve especially as a stimulus to insects of a particular species to produce one or more behavioral responses.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved automated, adjustable-interval insect trap is provided. The trap includes a plurality of means for capturing insects, that are selectively displacable, individually and sequentially, into an insect capturing position. Additional means are provided for guiding the movement of the plurality of insect capturing means into the insect capturing position. Further, a means is provided for moving and positively positioning the plurality of insect capturing means along the guide means into the insect capturing position. In accordance with the present method, a different one of the plurality of insect capturing means is selectively positioned in the insect capturing position for a selected time interval; that is, a time interval of known duration useful in studying the insect being investigated. In this way a permanent record of when insects are active and captured may be maintained.

More specifically, each of the insect capturing means includes a card having a surface coated with an insect adhesive. Further, each card is mounted to a tray that receives and holds the card. The tray further includes a plurality of wheels for engaging and rolling along the guide means. At least one spacing post is provided on each tray. The post functions to space the trays from one another when stacked on the guide means.

Preferably, the guide means includes a plurality of spaced, cooperating guide rails. Four parallel rails are provided in the most preferred arrangement. A base member or housing supports the guide rails in properly spaced position for smooth, rolling engagement by the wheels of the trays.

The positioning means includes a drive motor, an interval timer and means for engaging the trays. Preferably, the tray engaging means comprises an axle operatively connected to the drive motor. A bearing block on the base member supports the axle for rotation relative to the base member. Additionally, a plurality of plates are mounted to the axle for rotation therewith. More specifically, four plates are mounted to the axle at each of four longitudinally spaced locations. Each plate is substantially fan shaped defining an angle of substantially 120°. Further, each of the plates along the longitudinal axis of the axle is radially offset with respect to each adjacent plate by substantially 180°. Accordingly, alternating plates are substantially aligned on the axle. As will be described in greater detail below, the plates engage the stacked trays and positively move and position the trays along the guide rails.

More specifically, both the axle and guide rails are positioned so that their longitudinal axis are disposed vertically. Thus, the force of gravity is actually utilized to displace the trays along the guide rails. The fan plates mounted to the axle, however, may be selectively positioned to extend into the path of travel of the trays and therefore positively hold the trays in a desired position.

The insect capturing position is defined between trays held on the lowermost plate and the third lowermost plate. A pheromone source is provided on the underside of the third lowermost plate. This source attracts the insects being studied into the insect capturing position. Once there, the insects become trapped in the adhesive on the card held on the tray supported on the lowermost fan plate.

After a set time interval, the timer activates the drive motor that rotates the axle and the fan plates supporting the stack of trays. As the lowermost fan plate moves out from under the lowermost tray, previously held in the insect capturing position, the lowermost tray drops away under the force of gravity to a storage position. As the axle continues to turn through 360°, the remaining stacked trays are passed from one fan plate to the next until the next tray is held in the insect capturing position by the lowermost fan plate. This tray is then held in that position for the selected time interval. The axle is then once again rotated to advance the trays again in the manner just described. Of course, as should be appreciated, the trays in the storage position provide a permanent record of insect activity and capture that may be utilized to study and learn about the insect population, activity and/or the particular effectiveness of the pheromone being utilized.

In order to allow for long term, automated operation, it should, of course, be appreciated that the interval timer must be properly activated. Accordingly, an actuator switch is provided for the interval timer. This switch is activated by means of a pin on the axle that is driven by the drive motor. This pin engages and trips the actuator switch, reinitiating count-down of the interval timer, as the axle completes a 360° rotation from and into its original, home position.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is perspective view of the insect trap apparatus of the present invention;

FIG. 2 is a cross-sectional view through the guide rails showing the engagement of the tray wheels with the guide rails and the positioning of an insect adhesive coated card on the tray;

FIG. 3 is a bottom perspective view of the insect capturing means of the present invention showing the tray, tray wheels, spacing posts and insect adhesive coated card;

FIG. 4 is a schematical representation of the operating circuit of the invention showing the power source, interval timer, drive motor, actuator switch, actuating pin and axle of the moving and positioning means of the present invention; and FIGS. 5a-5e are schematical representations illustrating the operation of the automated, adjustable-interval insect trap including the positioning of a new insect capturing means in the insect capturing position.

Figure 5B:
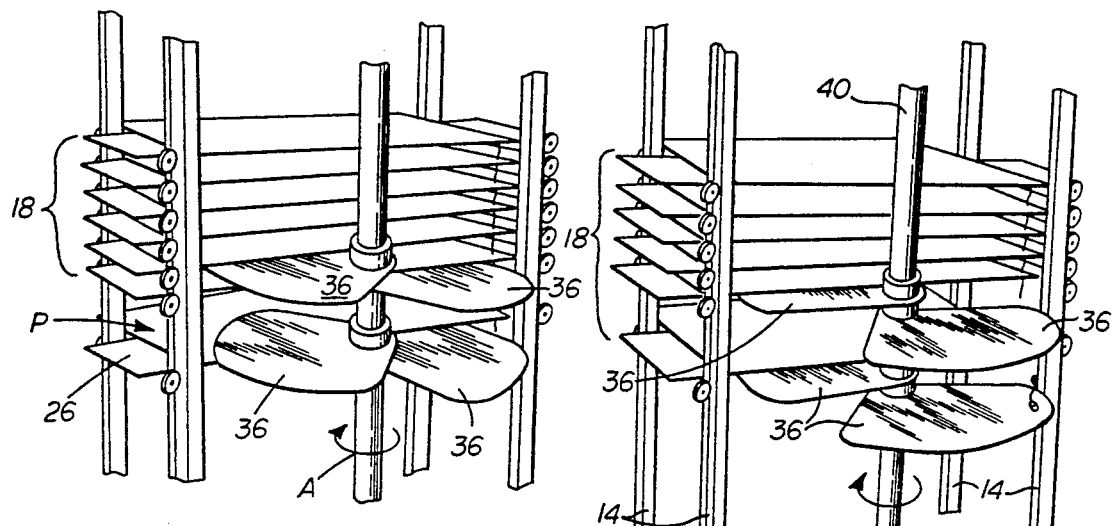

Reference will now be made in detail to the present preferred embodiment of the invention, an example of which is illustrated in the accompanying drawing.

DETAILED DESCRIPTION OF THE INVENTION

Reference is now made to FIG. 1 showing the automated, adjustable-interval insect trap 10 of the present invention. As shown, the insect trap 10 includes a base member or housing 12 providing a stable platform upon which the insect trap may be positioned, for example, upon the ground. Mounted to and projecting vertically upwardly from the base member 12 are a series of four guide rails 14. As will become more evident as the description of the trap 10 proceeds, these guide rails 14 function to guide the movement of a plurality of insect capturing means, generally designated by reference numeral 16, from a position in supply stack 18, to an insect capturing position, shown at P, and finally to a storage stack position generally designated by reference numeral 20.

More specifically, with reference to FIGS. 2 and 3 it should be appreciated that each insect trapping means 16 includes a card 22 of cardboard or other appropriate material that is treated upon its upper, exposed face with an insect adhesive (e.g. Tangle Trap insect adhesive as manufactured and sold by Tanglefoot Company). The card 22 is mounted as shown in FIGS. 2 and 3 by means of adhesive tape or other appropriate fastening means (not shown) to a rectangular tray 24. One wheel 26 is provided adjacent each corner of each tray 24. The wheels 26 rotate relative to the tray 24 on axles 28 held for relative rotation with respect to the tray by means of yokes 30.

As also shown in FIG. 2, when the tray 24 is positioned over the guide rails 14, one wheel 26 engages each guide rail. An outwardly projecting flange 32 is provided at the inner edge of each guide rail 14. These flanges 32 engage the wheels 26 to ensure that the wheels 26 maintain their position in proper alignment for guidance by the rails 14.

A series of three spacing posts 34 are provided projecting from the bottom face of each tray 24. The spacing posts 34 serve several functions. First, they prevent adjacent trays 24 in a stack of trays 18 or 20, from sticking together through contact between the insect adhesive on the card 22 held on the lower tray 24 with the bottom face of the upper tray. Second, the spacing posts 34 allow positive moving/positioning of the trays 24 between the supply stack 18, insect capturing P and storage stack 20 positions by operation of the fan plates 36 in a manner described in greater detail below. Third, the spacing posts 34 preserve the record of insects trapped on an insect adhesive treated card 22 by maintaining the necessary spacing between adjacent trays 24 to allow clearance for the insect.

The means for positive moving and positioning and moving of the trays 24 along the guide rails 14 between the supply stack 18, insect capturing position P and storage stack 20 is generally designated by reference numeral 38 in FIG. 1. As shown, the moving and positioning means 38 includes an axle 40. The axle 40 is held in a bearing block 41 (see also FIG. 4) in the base member 12 so as to be vertically oriented parallel to the guide rails 14.

As also shown in FIGS. 1 and 5a-5e, four fan plates 36 are fixed to the axle 40 at four spaced locations along the longitudinal axis of the axle. Each fan plate 36 defines an arc or angle of substantially 120°. Further, each fan plate 36 is radially offset with respect to each adjacent fan plate by substantially 180° whereby alternating plates are substantially aligned on the axle 40 (note particularly, 5a-5d).

Housed within the base member 12 are a power source, such as a battery generally designated by reference numeral 42, an interval timer 44, an actuator switch 46 for the interval timer 44 and a drive motor 48. As should be appreciated from viewing the schematic in FIG. 4, when the actuator switch 46 is closed by engagement with an activating pin 50 fixed to the axle 40, the circuit to the timer is closed causing the interval to be counted down. Once the set interval counts down to zero, the timer 44 functions to close the circuit from the battery 42 to the drive motor 48. The drive motor 48 then rotates the axle 40 causing the fan plates 36 to advance the trays 24 one position in a manner described in greater detail below. As the axle rotates 360° from and to the home position, the activating pin 50 again closes the actuator switch 46 resetting the interval timer 44 and interrupting power to the drive motor 48. Again, the interruption lasts for the set interval of the timer 44. Any adjustable interval timer of the type well known in the art may be utilized for this purpose. As such a timer may be set for intervals as short as, for example, fifteen minutes and as long as, for example, twenty-four hours, insect population activity may be very carefully studied as desired. Accordingly, insect population density and/or activity may be accurately determined. This allows the insect or pest to be better understood for the development of a more effective pest management system.

The setup and operation of the insect trap 10 will now be discussed in detail. Initially, the trap 10 is positioned at the desired location with the base member 12 resting upon a firm, level surface. The cap 52 is then removed from the upper ends of the guide rails 14.

Next, cards 22, treated with an insect adhesive on one surface, are mounted by means of double sided tape or other adhesive fastener upon the opposing surface to trays 24. One card 22 is mounted to each tray 24 in the manner shown in FIGS. 2 and 3. Each tray 24 including a card 22, is then positioned so that the wheels 26 are received over the guide rails 14 (see FIG. 2), card side up. The first tray 24 positioned over the guide rails 14 then glides down the guide rails under the force of gravity until it engages and is held in position by the uppermost fan plate 36. Additional trays 24 subsequently added glide down the guide rails 14 until the spacing posts 34 extending from the lower face of the trays engage the card 22 of the underlying tray 24. Accordingly, a supply stack 18 is formed. Once a sufficient supply or quantity of trays 24 to complete a study is positioned on the guide rails 14, the cap 52 is replace. Cap 52 includes a series of apertures, one for the receipt of each upper end of a guide rail 14. Accordingly, it should be appreciated that the cap 52 functions with the base member 12 to hold the guide rails 14 in the necessary spacial orientation to prevent the wheels 26 from binding thereby allowing smooth gliding action of the trays 24. This is important to insure smooth and proper automated operation of the trap 10.

A pheromone source or other insect attractant 54 is then provided on the lower surface of the third uppermost fan plate 36. Accordingly, as will be more apparent as the description hereof proceeds, when a tray 24 is held on the lowermost fan plate 36, the pheromone source 54 is held directly above the card 22 on that tray (e.g. the card held in the insect capturing position P). As the insects are drawn toward the pheromone source 54, they land on the card 22 mounted to the tray 24 held by the lowermost fan plate 36. The insects are then trapped in the adhesive on the card 22 and a permanent record is made of the insect activity.

The next step in preparing the trap 10 for operation is the powering of the drive motor 48 until the lowermost or first tray 24 is held in the insect trapping position P on the lowermost plate 36. This is accomplished by activating the drive motor 48 to rotate the axle 40. As the axle 40 is rotated, the trays 24 are passed serially first from the uppermost fan plate 36 to the third uppermost fan plate to the second uppermost fan plate and finally to the lowermost fan plate. The drive motor 48 is then stopped and the interval timer 44 is set for the desired interval, that is, the time period during which each tray 24 and adhesive coated card 22 is to be held in the insect capturing position P. Timer count down is then initiated. From this point on, operation of the insect trap 10 is fully automated.

Once the set interval times out, the timer 44 completes the circuit from the battery 42 to the drive motor 48. The drive motor 48 then rotates the axle 40. As the axle 40 rotates, the fan plates 36 are rotated in the direction of action A from the position shown in FIG. 5a, through the position shown in FIG. 5b to the position shown in FIG. 5c (e.g. rotation through 180 degrees of arc). As should be appreciated, during this rotation, the lowermost fan plate 36 is rotated out from beneath the tray 24 previously held for the set time interval in the insect capturing position P. That tray 24 then drops away under the force of gravity (note action arrow B) down the guide rails 14 to the storage stack position 20.

Simultaneously, the next lowermost tray 24 is passed from the third uppermost fan plate 36 downwardly to the second uppermost fan plate 36. Also simultaneously, the uppermost fan plate 36 is rotated into position to support the next tray 24 of the supply stack 18. As should be appreciated from reviewing FIG. 2, the spacing posts 34 are positioned in the necessary arc to provide clearance and allow passage of the fan plates 36 for purposes of positive positioning.

Figure 5C:
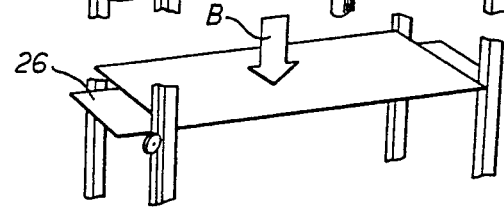
Figure 5D:
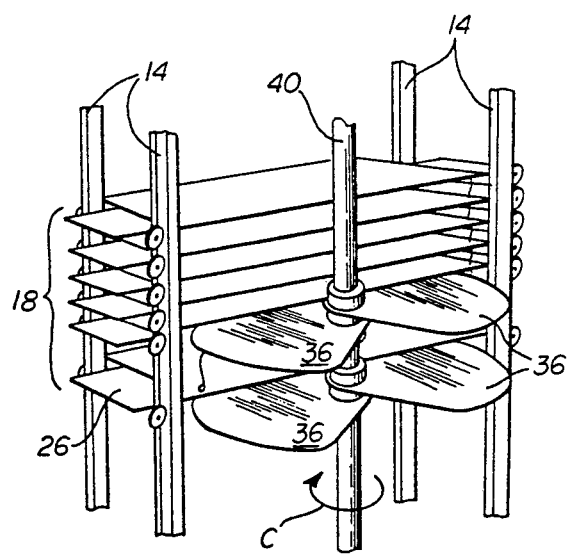
Figure 5E:
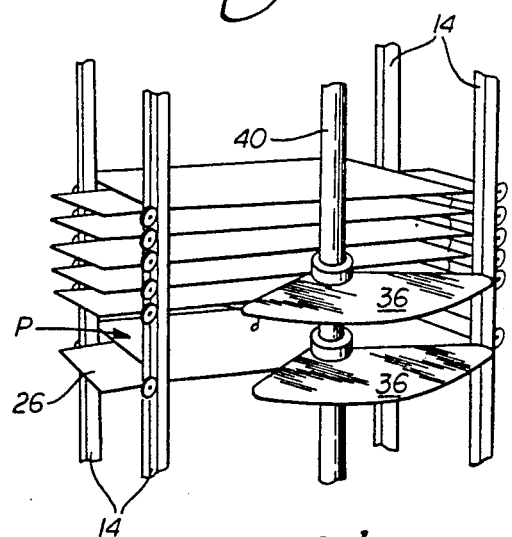

As the axle 40 continues to rotate (see action arrow C) under the influence of the drive motor 48, the fan plates 36 are rotated from the position shown in FIG. 5c through the position shown in FIG. 5d to the position shown in FIG. 5e (e.g. rotation through a second 180° of arc). As this occurs, the second lowermost fan plate 36 is rotated out from the lowermost tray 24 in the supply stack 18. That lowermost tray 24 then drops onto the lowermost fan plate 36 which continues to be rotated fully underneath that tray as shown in FIG. 5e. At the point that the axle has rotated through a full 360°, the activating pin 50 engages the actuator switch 46 resetting the interval timer 44 and interrupting power to the drive motor 48. Accordingly, the next tray 24 is held in the insect trapping position P with the pheromone source 54 on the lower side of the third uppermost plate 36 positioned directly thereover to attract insects.

Simultaneously with the movement of the lowermost tray 24 from the supply stack 18 just described, the next lowermost tray 24 moves into a "on deck" position supported by the third uppermost plate 36. More specifically, as shown in FIG. 5d, the uppermost plate 36 is rotated out from beneath that tray 24 which then drops under the force of gravity onto the upper face of the third uppermost plate 36. That plate 36 is then fully rotated under the tray 24 so as to effectively hold the entire supply stack 18 in position (note FIG. 5e).

In summary, the insect trap 10 of the present invention is a light weight, portable device of relatively simple construction capable of providing reliable operation over a long service life. Advantageously, the interval of insect trapping by each card 22 may be selectively adjusted. This allows the completion of studies to better determine periodicity of insect activity for any particular insect population and/or the effectiveness of the attractant and activity of particular pheromones selected for testing. As a further advantage, the individual cards 22 coated with insect adhesive may be stored and referred to in a convenient manner, making a permanent record by which any study completed may be documented.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. An automated, adjustable-interval insect trap, comprising:

a plurality of capturing means for capturing insects, said plurality of insect capturing means being selectively displaceable into an insect capturing position;

guide means for guiding movement of said plurality of insect capturing means into said insect capturing position; and positioning means for positively positioning said plurality of insect capturing means along said guide means into said insect capturing position whereby a different one of said plurality of insect capturing means is selectively positioned in said insect capturing position for a selected time interval.

2. The insect trap set forth in claim 1, wherein each of said insect capturing means includes a card having a surface coated with an insect adhesive.

3. The insect trap set forth in claim 2, wherein each of said insect capturing means further includes a tray for receiving said card, said tray further including a plurality of wheels for engaging and rolling along said guide means.

4. The insect trap set forth in claim 3, wherein each said tray further includes at least one spacing post for spacing said trays from one another when stacked along said guide means.

5. The insect trap set forth in claim 3, wherein said guide means includes a plurality of spaced, cooperating guide rails.

6. The insect trap set forth in claim 5, further including a base member for supporting said guide rails in properly spaced position for engagement with wheels of said trays.

7. The insect trap set forth in claim 6, wherein said positioning means includes a drive motor, an interval timer and means for engaging said trays.

8. The insect trap set forth in claim 7, wherein said tray engaging means comprises an axle operatively connected to said drive motor, a bearing block on said base member supporting said axle for relative rotation and a plurality of plates for engaging said trays mounted to said axle for rotation therewith.

9. The insect trap set forth in claim 8, wherein four plates are mounted to said axle, one plate at each of four longitudinally spaced locations.

10. The insect trap set forth in claim 9, wherein each plate is substantially fan shaped, defining an angle of substantially 120°.

11. The insect trap set forth in claim 10, wherein each of said four plates along said longitudinal axis of said axle is radially offset with respect to each adjacent plate by substantially 180° whereby alternating plates are substantially aligned on said axle.

12. The insect trap set forth in claim 11, wherein said axle extends in a vertical direction parallel to said guide rails and said insect capturing position is defined between trays held on a lowermost plate and a third lowermost plate.

13. The insect trap set forth in claim 12, wherein a pheromone source is provided on an underside of said third lowermost plate in said insect capturing position.

14. An automated, adjustable-interval insect trap, comprising:

a plurality of capturing means for capturing insects, said plurality of insect capturing means being selectively displaceable into an insect capturing position;

guide means for guiding movement of said plurality of insect capturing means into said insect capturing position; and positioning means for positively positioning said plurality of insect capturing means along said guide means into said insect capturing position said positioning means including a drive motor, an interval timer and means for engaging said plurality of insect capturing means whereby a different one of said plurality of insect capturing means is selectively positioned in said insect capturing position at a selected time interval.

15. The insect trap set forth in claim 14, wherein said means for engaging said plurality of insect capturing means further includes an axle operatively connected to said drive motor, a bearing block supporting said axle for relative rotation and a plurality of plates, for engaging said means for engaging said plurality of insect capturing means, mounted to said axle for rotation therewith.

16. The insect trap set forth in claim 15, wherein four plates are mounted to said axle, one plate at each of four longitudinally spaced locations.

17. The insect trap set forth in claim 16, wherein each plate is substantially fan shaped, defining an angle of substantially 120°.

18. The insect trap set forth in claim 17, wherein each of said four plates along said longitudinal axis of said axle is radially offset with respect to each adjacent plate by substantially 180° whereby alternating plates are substantially aligned on said axle.

19. The insect trap set forth in claim 18, wherein said axle extends in a vertical direction parallel to said guide means and said insect capturing position is defined between insect capturing means held on a lowermost plate and a third lowermost plate.

20. The insect trap set forth in claim 19, wherein a pheromone source is provided on an underside of said third lowermost plate in said insect capturing position.

21. The insect trap set forth in claim 20, further including an actuator switch for said interval timer.

22. The insect trap set forth in claim 21, further including an activation pin on said axle for engaging and tripping said actuator switch.

* * * * *